(12) United States Patent
Bathe

(10) Patent No.: US 10,502,940 B2
(45) Date of Patent: Dec. 10, 2019

(54) MULTI-COLOR SCANNING MICROSCOPE

(71) Applicant: Carl Zeiss Microscopy GmbH, Jena (DE)

(72) Inventor: Wolfgang Bathe, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 246 days.

(21) Appl. No.: 15/105,215

(22) PCT Filed: Dec. 19, 2014

(86) PCT No.: PCT/EP2014/078880
§ 371 (c)(1),
(2) Date: Jun. 16, 2016

(87) PCT Pub. No.: WO2015/092024
PCT Pub. Date: Jun. 25, 2015

(65) Prior Publication Data
US 2016/0320599 A1    Nov. 3, 2016

(30) Foreign Application Priority Data
Dec. 19, 2013    (DE) .................. 10 2013 022 026

(51) Int. Cl.
*G02B 21/00* (2006.01)
*G02B 21/18* (2006.01)

(52) U.S. Cl.
CPC ....... *G02B 21/0076* (2013.01); *G02B 21/006* (2013.01); *G02B 21/008* (2013.01);
(Continued)

(58) Field of Classification Search
CPC .. G02B 21/00; G02B 21/0004; G02B 21/002; G02B 21/0024; G02B 21/0028;
(Continued)

(56) References Cited

U.S. PATENT DOCUMENTS

| 5,304,810 A | 4/1994 | Amos |
| 6,028,306 A | 2/2000 | Hayashi |

(Continued)

FOREIGN PATENT DOCUMENTS

| DE | 19829981 A1 | 1/2000 |
| DE | 10004191 A1 | 12/2000 |

(Continued)

OTHER PUBLICATIONS

Butter, M., International Application No. PCT/EP2014/078880, International Search Report and Written Opinion with English translation, dated Mar. 27, 2015, 16 pages.
(Continued)

*Primary Examiner* — Stephone B Allen
*Assistant Examiner* — Adam W Booher
(74) *Attorney, Agent, or Firm* — LaBatt, LLC

(57) ABSTRACT

The invention relates to a multi-color scanning microscope comprising at least one first light source for emitting a first excitation beam comprising first excitation light having a first wavelength and a second light source for emitting a second excitation beam comprising second excitation light having a second wavelength, which differs from the first wavelength, comprising coupling-in means for coupling the first excitation beam and/or the second excitation beam into an excitation beam path, comprising optical means for guiding the first excitation beam and the second excitation beam to a sample and for guiding detection light emitted by the sample in a detection beam path to a detection unit, wherein the optical means comprise at least the following components: at least one first main color splitter for separating the first excitation light and/or the second excitation light, on the one hand, from the detection light emitted by the sample, on the other hand, a scanner for scanning the sample with at least the first excitation light and the second (Continued)

excitation light, a microscope objective for focusing the first excitation light and the second excitation light onto or into the sample and for guiding the detection light emitted by the sample in the direction of the detection unit, and comprising the detector unit for detecting the detection light emitted by the sample. The microscope is characterized in that the coupling-in means and at least parts of the optical means are designed and arranged in such a way that the first excitation beam having the first wavelength is guided onto a first sample location and the second excitation beam having the second wavelength is guided onto a second sample location, which differs from the first sample location, and in that the detector unit comprises a first detector for detecting the light emitted by the first sample location and a second detector for detecting the light emitted by the second sample location.

21 Claims, 5 Drawing Sheets

(52) U.S. Cl.
CPC ..... *G02B 21/0032* (2013.01); *G02B 21/0064* (2013.01); *G02B 21/18* (2013.01)

(58) Field of Classification Search
CPC .. G02B 21/0032; G02B 21/0036–0048; G02B 21/0052; G02B 21/006; G02B 21/0064; G02B 21/0076; G02B 21/008; G02B 21/06; G02B 21/16; G02B 21/18; G01N 21/6458; G01N 15/1434; G01N 2021/6419; G01N 2021/6421
See application file for complete search history.

(56) References Cited

U.S. PATENT DOCUMENTS

| | | | |
|---|---|---|---|
| 6,462,345 | B1 | 10/2002 | Simon et al. |
| 2004/0042007 | A1 | 3/2004 | Osipchuk et al. |
| 2004/0178356 | A1 | 9/2004 | Natori |
| 2009/0109527 | A1* | 4/2009 | Sasaki ................ G02B 21/0032 359/389 |
| 2010/0301232 | A1 | 12/2010 | Erlbacher et al. |
| 2011/0300490 | A1* | 12/2011 | Rachet ............... G02B 21/0032 430/322 |
| 2013/0015370 | A1 | 1/2013 | Damaskinos et al. |
| 2014/0192406 | A1 | 7/2014 | Bathe |

FOREIGN PATENT DOCUMENTS

| | | |
|---|---|---|
| EP | 2053442 A1 | 4/2009 |
| EP | 2053447 A1 | 4/2009 |
| JP | 2003185927 A | 7/2003 |
| WO | 9201966 A1 | 2/1992 |
| WO | 2013020663 A1 | 2/2013 |

OTHER PUBLICATIONS

European Application No. 14827438.4, Office Action, dated Apr. 8, 2019, 8 pages (English Translation not available).
Japanese Application No. 2016-541295, Office Action with English Translation, dated Jan. 8, 2019, 9 pages.

* cited by examiner

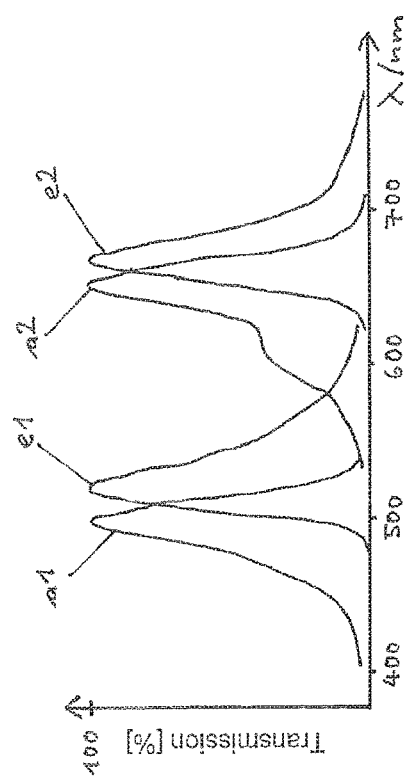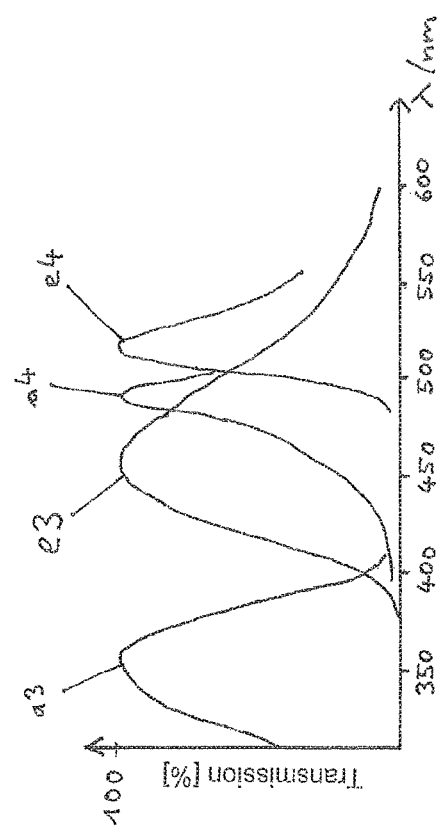

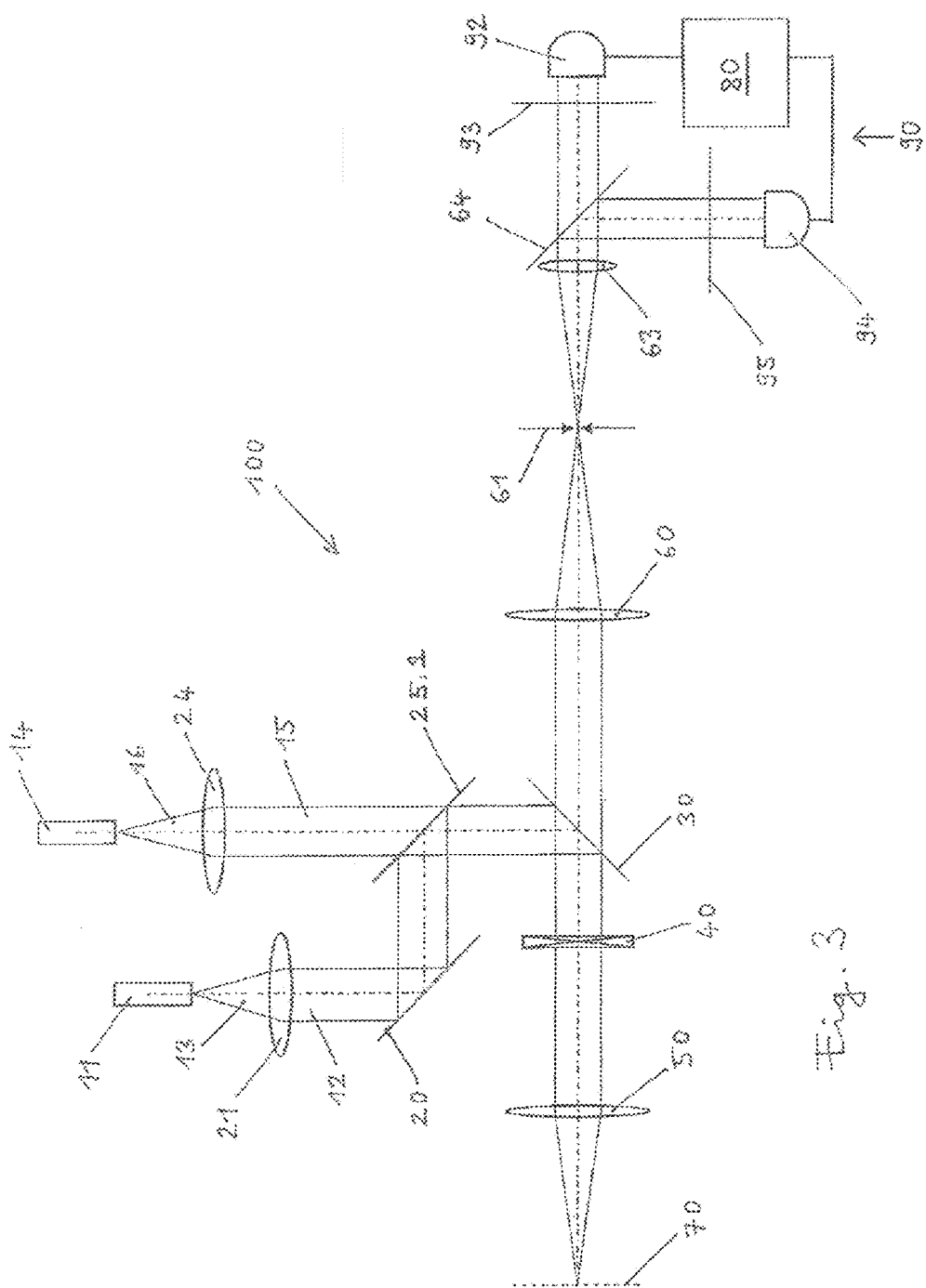

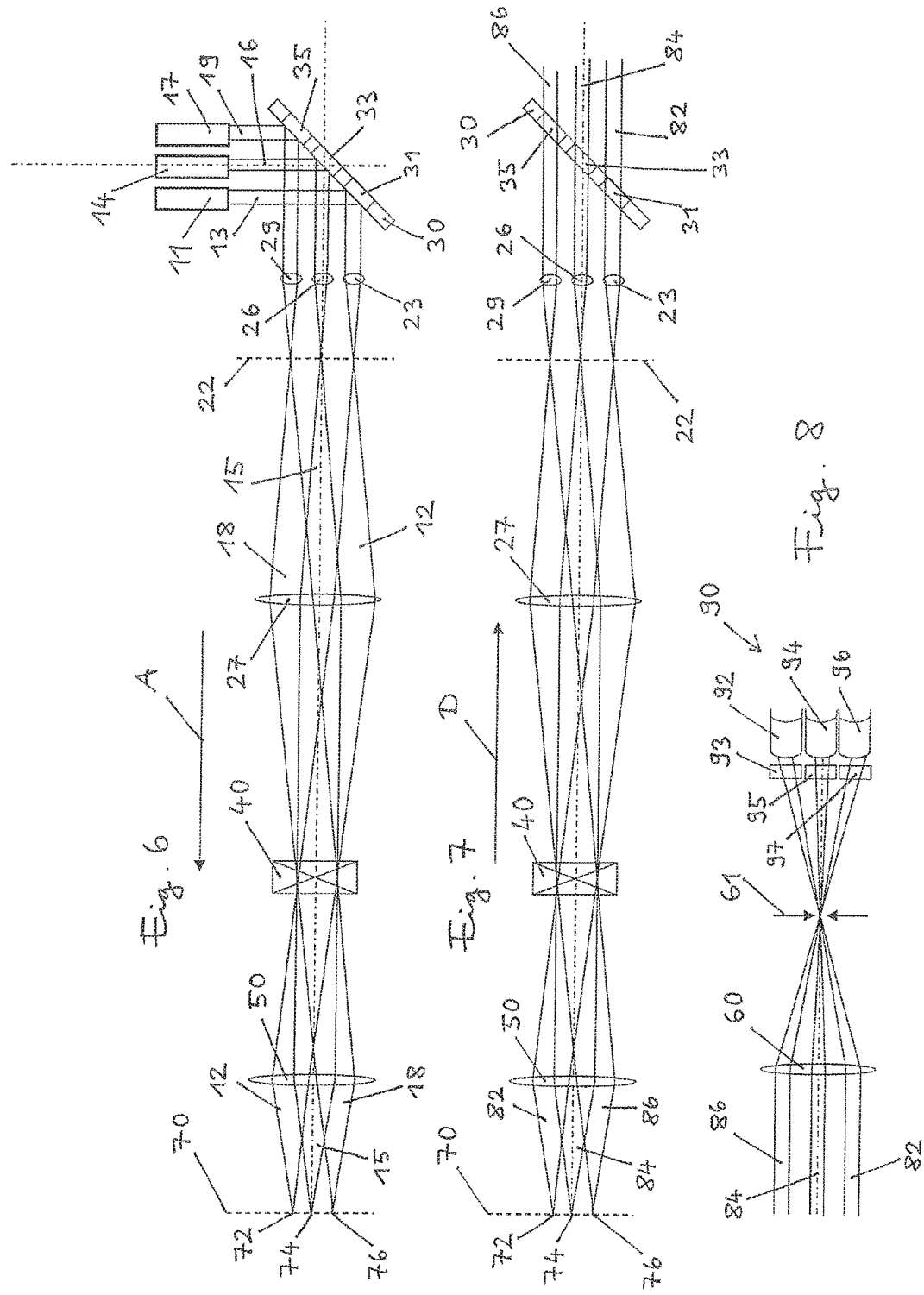

MULTI-COLOR SCANNING MICROSCOPE

The present invention relates to a multi-color scanning microscope according to the preamble to claim 1.

Such multi-color scanning microscopes are known in principle and have the following components: at least one first light source for emitting a first excitation beam with first excitation light of a first wavelength and a second light source for emitting a second excitation beam with second excitation light of a second wavelength which is different from the first wavelength, coupling-in means for coupling the first excitation beam and/or the second excitation beam into an excitation beam path, and optical means for guiding the first excitation beam and the second excitation beam to a specimen and for guiding detection light emitted by the specimen in a detection beam path to a detection unit.

The optical means have at least the following components: at least one first main color splitter for separating the first excitation light and/or the second excitation light on the one hand from the detection light emitted by the specimen on the other hand, a scanner for scanning the specimen with at least the first excitation light and the second excitation light, a microscope objective for focussing the first excitation light and the second excitation light onto or into the specimen and for guiding the detection light emitted by the specimen in the direction of the detection unit.

Finally, in the generic multi-color scanning microscope the detector unit is provided to detect the detection light emitted by the specimen.

In fluorescence microscopy, fluorescent dyes are used, with which specimen parts can be specifically stained. For example there are dyes which substantially only stain the cell nucleus. Other dyes stain above all the cytoskeleton. Individual specimen parts can be observed through these specific staining measures without other specimen parts becoming visible and causing interference. Frequently, the differently stained specimen parts are also shown in different colors in the microscope so that the type of the specimen parts can be clearly detected by the color. A fundamental task is that a fluorescence microscope is to separate the dyes from each other as well as possible. For this, on the one hand the excitation light can be proficiently selected. Alternatively or additionally, the separation can be influenced by the detected spectrum. However, a complete separation is not always possible through a selection of the wavelengths.

This will be explained using two examples by reference to FIG. 1 and FIG. 2. In each case, excitation and emission spectra, which can also be called detection spectra, are shown and in each case the intensity is entered in arbitrary units against the wavelength $\lambda$ in nm.

FIG. 1 shows the excitation spectrum a1 and the detection or emission spectrum e1 of the dye Alexa 488 as well as the excitation spectrum a2 and the detection spectrum e2 of the dye Alexa 647. As can be seen from FIG. 1, in particular the detection or emission spectra e1 and e2 have only a small overlap, i.e. these dyes can be well separated from each other.

The excitation of Alexa 488 can be realised with light of the wavelength 488 nm. At this wavelength the second dye Alexa 647 is indeed negligibly co-excited. However, Alexa 647 emits only with effect from approximately 620 nm. If the detection channel for Alexa 488 is limited to the spectral range 489 nm to 619 nm, only Alexa 488 is detected in this channel.

Alexa 647, on the other hand, can be efficiently excited with the wavelength 642 nm. If the detection is limited here to the range 643 nm and longer, only Alexa 647 is detected, as Alexa 488 no longer emits in this range.

The second example relates to the dyes DAPI and FITC which cannot be separated during simultaneous observation.

FIG. 2 shows the excitation spectrum a3 and the detection spectrum e3 of the dye DAPI as well as the excitation spectrum a4 and the detection spectrum e4 of the dye FITC.

DAPI can, as can be seen in FIG. 2, be excited in the UV range without FITC being excited. If FITC is excited, for example with 488 nm, DAPI can be detected in the range below 488 nm without FITC becoming visible here. The emission of FITC takes place, however, completely in the range of the very broad DAPI emission, so that a detection of FITC without DAPI is not possible.

Essentially two methods are known in the prior art that allow a complete separation. In the first of these known methods the recording of the images is carried out one after the other for the different dyes. Then, for example, initially only the DAPI dye can be recorded. As the dye FITC is not excited in the DAPI excitation, also the whole DAPI spectrum can now be detected, which is advantageous with respect to the signal to noise ratio. In a second recording which takes place in time before or after the first recording, FITC is excited at 488 nm. As this wavelength does not excite the dye DAPI, FITC can also be detected independently from DAPI. Through such a sequential recording, the dyes can be separated. However, the net image recording time has doubled. In addition, even more time may be lost, for example for switching filters. All in all, this method does not therefore achieve an optimally short image recording time.

In the second known method, a subsequent separation of the dyes can be achieved with simultaneous recording. In this method, which is also described as demixing, the signals of the color channels are not directly evaluated, but instead their linear combinations are used as an image, in which in each case only one dye emerges. In mathematical terms, this is always possible in the absence of errors. This method is in principle fast because only one recording is needed. However, it also has systematic disadvantages. Even if the method works ideally, the signal to noise ratio worsens with respect to separate recordings. For example, although the dye A does not generate a signal in the channel of dye B, it still contributes to the noise. In other words, the noise level at a location where something is removed is relatively greater. In addition, the separation is frequently not managed completely, for example because the assumed spectra of the dyes are not exactly correct and/or because non-linearities, for example saturated image areas, arise in the recording.

It can be regarded as an object of the present invention to provide a multi-color scanning microscope which facilitates a good separation of the light emitted by different dyes in short measuring times.

This object is achieved by the multi-color scanning microscope having the features of claim 1.

The multi-color scanning microscope of the above-mentioned type is further developed according to the invention in that the coupling-in means and at least parts of the optical means are set up and arranged so that the first excitation beam with the first wavelength is guided onto a first specimen location and the second excitation beam with the second wavelength onto a second specimen location which differs from the first specimen location, and the detector unit has a first detector for detecting the light emitted by the first specimen location and a second detector for detecting the light emitted by the second specimen location.

Preferred variants of the multi-color scanning microscope according to the invention, which can also be described as a multi-spot scanning microscope, are described below, in particular with reference to the dependent claims and the appended figures.

It can be regarded as a core idea of the present invention to combine the principle of a multi-spot excitation with that of a multi-color microscopy.

This combination allows a substantial advantage to be achieved in that, with a given scan time of a scanning microscope, the spectral separation of different dyes of the specimen is improved, and that, with required or necessary spectral separation, the scan time is reduced.

Excitation light according to the meaning of the invention described here is electromagnetic radiation, wherein in particular the infrared, visible and ultraviolet parts of the spectrum are meant. In principle, all radiation sources that provide the necessary electromagnetic radiation with the desired intensity can be provided as light sources. Particularly preferably, lasers, for example argon-ion lasers with a wavelength of 488 nm or diode-pumped solid state (DPSS) lasers with a wavelength of 561 nm, are used. In principle, however, other light emitting diodes or other illuminating means can also be used.

It is particularly useful for confocal diaphragms to be arranged in front of the detectors so that the multi-color or multi-spot scanning microscope is a confocal microscope with all advantages and properties that are known in principle.

A diaphragm is described as confocal if it is positioned in or in proximity to a confocal plane. The term "confocal plane" is used for a plane of the detection beam path optically conjugated to a specimen-side focal plane of the microscope objective. A confocal diaphragm in front of a detector limits the light absorption of this detector to a small target volume at the specimen location.

All detectors that are sufficiently sensitive for the electromagnetic radiation to be detected and have a sufficiently good signal to noise ratio can be used in principle as detectors. In principle, semiconductor detectors can be used for this. Due to the fact that in the main field of use of fluorescence microscopy the counting rates are compartitively small, photomultipliers are frequently used, however.

In exemplary embodiments of the invention, wherein only the first, thus only one, main color splitter is provided, this first main color splitter can also be simply described as the main color splitter.

In addition the first and possible further main color splitters can also be, or form part of, the coupling-in means.

In a particularly preferred exemplary embodiment, coupling-in means are provided for coupling the first excitation beam at a first angle into the excitation beam path and for coupling the second excitation beam into the excitation beam path at a second angle which differs from the first angle. The first excitation light and the second excitation light can thus be spatially separated. In principle all optical components, with which the first and the second excitation light and possibly further spectral components, thus further excitation light, in particular wavelength-specific, can be coupled into the excitation beam path, can be used as coupling-in means. In principle, diffractive and/or refractive components can be used for this. Mirrors or semi-transparent mirrors are particularly preferably used.

In principle the invention can be realised with a structure, wherein only one main color splitter is present. In these variants, for different combinations of lasers, different main color splitters must also be respectively kept available. The main color splitter can advantageously have a plurality of notch filters for providing the desired spectral properties.

In a further particularly advantageous variant, besides the first main color splitter, a second main color splitter is provided and the first excitation beam is coupled with the first main color splitter and the second excitation beam is coupled with the second main color splitter into the excitation beam path. This variant has the advantage that a special main color splitter is not necessary for each combination of different laser sources.

A further variant, wherein different excitation light sources can in principle be arbitrarily combined with each other, is characterised in that the first main color splitter is used as coupling-in means and has a first segment at least for coupling-in of the first excitation beam into the excitation beam path and a second segment for coupling-in of the second excitation beam into the excitation beam path. The first main color splitter in this exemplary embodiment is therefore a segmented component and contains in principle a separate main color splitter for each color of the excitation light. In principle, with such a structure, the different excitation light sources can be moved together with their respectively assigned segment of the main color splitter into the beam path, for example being pivoted, and moved out of it again.

The number of different colors of the excitation light to be used in the microscope according to the invention is not limited in principle but is instead only limited by the construction space practically available. For example, in further advantageous variants therefore at least one further light source can be provided for emitting a further excitation beam with further excitation light, of which the wavelength(s) is/are different from the first wavelength and the second wavelength, and further coupling-in means can then be usefully provided for the further excitation beam(s), the in-coupling means being adapted and positioned with at least parts of the optical means in such a way that the further excitation beam(s) can be focussed onto further respectively different specimen locations. This specimen location or these specimen locations is/are different from the first specimen location, onto which the first excitation beam can be focused, and the second specimen location, onto which the second excitation beam can be focussed.

It is also useful in this context if, for separate detection of detection light radiated back by different specimen regions, at least a number of detectors corresponding to the number of excitation beams are provided.

In principle, structures are preferred, wherein one and the same scanner is used to scan the specimen with the different colors, thus the first, the second and possibly further excitation light.

The scanner is particularly advantageously positioned in a pupil of the microscope objective. This arrangement, which is also described as a tele-centric arrangement, has the advantage that the excitation beams always impinge perpendicularly onto the specimen plane if this is defined perpendicular to the optical beam path.

Due to the offset of the spatially different excitation spots for the different colors, when using only a single scanner there is necessarily also a spatial offset of the images recorded for the different colors. This offset can be calculated out in principle with an evaluation computer.

It is useful, in particular in order to manage this discounting of the spatial offset for the images obtained with the different colored excitation spots, for an evaluation unit to be provided. This evaluation unit can generally serve to evaluate the measurement data supplied by the detectors.

In principle, the images thus obtained are, however, smaller in comparison with the images obtained in case of excitation with a single excitation spot. Indeed, they are only as large as the common overlap of all images recorded with different excitation spots.

These disadvantages can be avoided in a further advantageous embodiment of the invention, wherein a separate scanner is provided for each excitation beam to be coupled into the excitation beam path.

In order to ensure that the images obtained for different excitation spots can be as comparable with each other as possible, the pinholes used in front of the detectors should be as far as possible of equal size. Variable pinholes are particularly preferably used. A variation ratio can thereby be typically 1:60. For example, the diameter can then be varied between 10 and 600 µm. The precision of the adjustment relative to the diameter is thereby typically smaller than 10% of the diameter. In addition, a geometry requirement is placed on the pinholes, for example round pinholes are to be or to remain as round as possible, irrespectively of the diameter. In principle, square pinholes can also be used. These should then have a square form, irrespectively of the length of the sides of the square. Eccentricities should thereby be smaller than 10% of the length of the sides of the square or the diameter of a circular pinhole.

If multi-pinhole arrangements are used, the mentioned requirements must be simultaneously met for all pinholes. If therefore—as is frequently useful and preferred—the diameters of the pinholes are to be varied, it must be ensured here that the diameters of all pinholes can be adjusted as far as possible synchronously.

In principle, individual pinholes that can be adjusted independently of each other can also be used. The synchronisation must then be calibrated.

In this connection, embodiments of the microscope according to the invention are particularly preferred, wherein the light emitted by the first specimen location and the light emitted by the second specimen location, in particular generally the light emitted by the different illuminated specimen locations, passes through one and the same common pinhole or through one and the same common, in particular confocal, pinhole. These variants are characterised in that the synchronisation is naturally produced automatically upon adjustment of the pinholes for all part beam paths for the different illuminated specimen locations, because only one single pinhole needs to be adjusted. Accordingly, neither expensive, jointly adjustable, multiple pinholes nor a plurality of individually adjustable, expensive, individual pinholes are necessary. A comprehensive calibration is also no longer necessary.

The term pinhole is used continuously within the scope of this application.

The common pinhole can advantageously be positioned in an intermediate image plane of the detection beam path. The common pinhole can particularly preferably be positioned in front of, preferably directly in front of, the first and the second, in particular generally in front of the different detectors used. The pinhole, through which the light emitted by the different illuminated specimen locations passes, is also described as a common pinhole.

In order to provide the suitable beam paths which allow the light beams coming from the different specimen locations to be guided through one and the same pinhole, variants of the microscope according to the invention are advantageous, wherein, for each excitation beam in the excitation beam path and/or for each detection beam in the detection beam path, respectively separate optical means, in particular at least one separate lens, are provided. The optical axes of the separate optical means used for the different excitation beams and/or detection beams, in particular of the separate lenses, are preferably displaced parallel relative to each other.

The detection light emitted by a certain illuminated specimen location is thereby described as a detection beam.

The production of such partial lenses is simpler and less expensive in comparison with the production of jointly adjustable multiple pinholes. For example focal distance tolerances in the small single-digit percentage range are standard. The optical size of a pinhole "seen" by each partial beam thus fluctuates likewise only in this range. Particularly preferably lenses can be used which have been produced lithographically on a common carrier. Such production processes also allow high precision.

In preferred embodiments of the microscope according to the invention accordingly, in particular at equivalent locations of the excitation beam path and/or of the detection beam path, the separate lenses for the separate partial beam paths for the individual illuminated specimen locations are lenses lithographically produced on a common carrier.

The path of the excitation light from the light source(s) as far as the specimen is described as an excitation beam path and correspondingly the path of the detection light from the specimen to the detector(s) as a detection beam path.

The excitation beams and the detection beams are described as separate partial beam paths of the excitation and/or the detection beam path.

The use of a common pinhole conveys, so to speak, the precision requirement of the plurality of pinholes—where it is comparatively more expensive to realise—to the plurality of separate lenses which, as such, are easier to produce.

The significant technical effect of the separate lenses is that these convert beams coming from the different specimen locations to collimated beams parallel to each other, which can then be focussed by a lens in front of the common pinhole on precisely this common pinhole.

Further advantages and features of the present invention are explained below by reference to the attached figures, in which:

FIG. 1 shows excitation and detection spectra for the fluorescent dyes Alexa 488 and Alexa 647;

FIG. 2 shows excitation and detection spectra for the fluorescent dyes DAPI and FITC;

FIG. 3 shows an exemplary embodiment of a multi-color scanning microscope according to the prior art;

FIGS. 6 to 8 show a third exemplary embodiment of a multi-color scanning microscope according to the invention.

Figure 4:
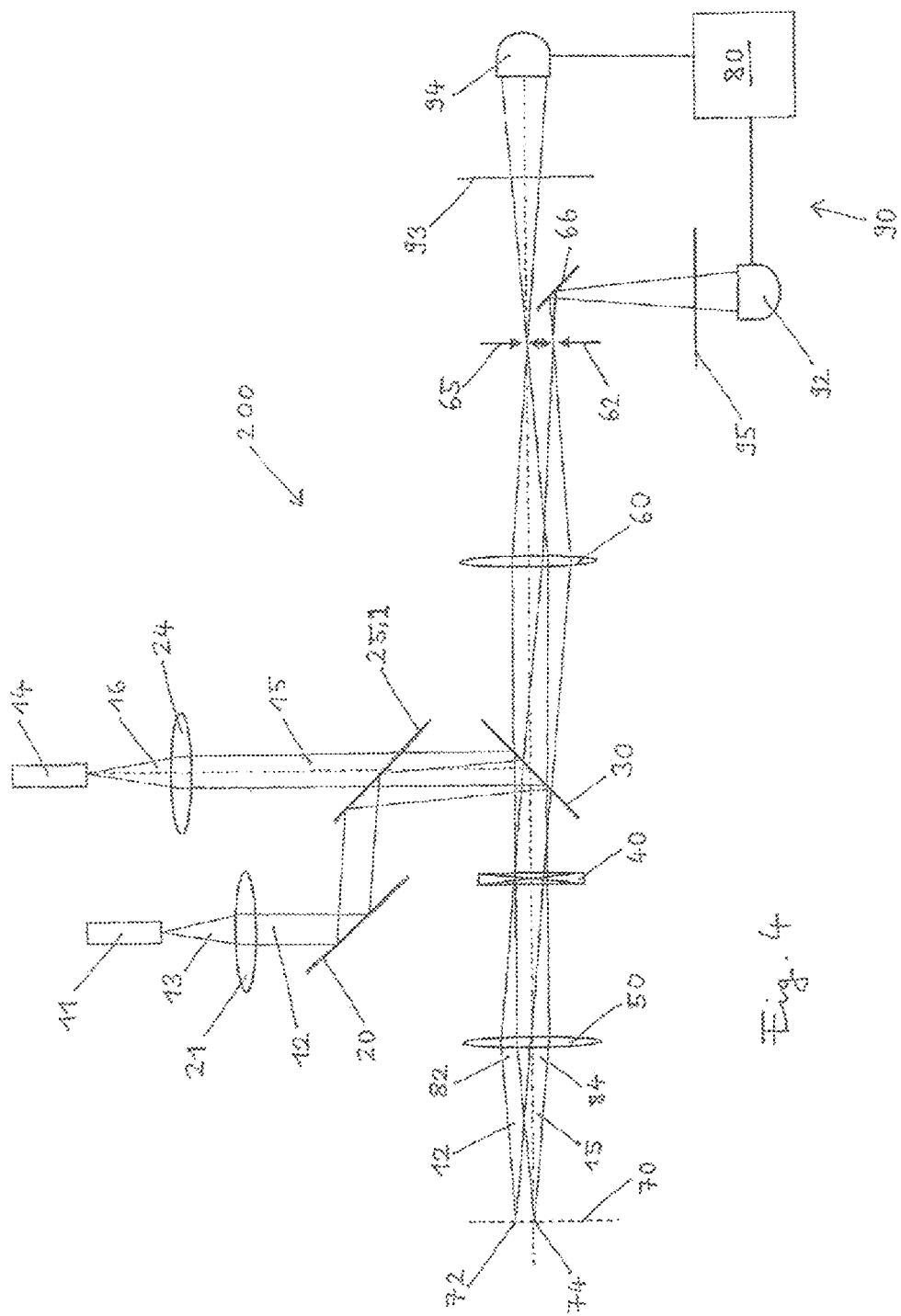
FIG. 4 shows a first exemplary embodiment of a multi-color scanning microscope according to the invention.

A generic scanning microscope is explained by reference to FIG. 3. The scanning microscope 100 shown therein has as essential components: a first light source 11 and a second light source 14, a main color splitter 30, a scanner 40, a microscope objective 50 and a detection unit 90.

The first light source 11 emits a first excitation beam 12 with first excitation light 13 which has a first wavelength. Correspondingly, the second light source 14 emits a second excitation beam 15 with second excitation light 16 which has a second wavelength that differs from the first wavelength. The first excitation light 13 of the first light source 11 is guided via a lens 21 and a mirror 20 as coupling-in means 20 onto a semi-transparent mirror 25.1 as further coupling-in means. Via this semi-transparent mirror 25.1 the first excitation light 13 is coupled into an excitation beam path of the microscope. The second excitation light 16 is guided from a lens 24 in the direction of the semi-transparent mirror 25.1. At least a part of the second excitation light 16 is transmitted by this semi-transparent mirror 25.1 and arrives, together with the first excitation light 13, on the main color splitter 30.

The main color splitter 30 guides the first excitation light 13 and the second excitation light 16 via the scanner 40 in the direction of the microscope objective 50. With the aid of the scanner, the first excitation light 13 and the second excitation light 16 are guided onto respectively the same specimen areas of the specimen 70. In response to the incidence of the first and the second excitation light, referred to below generally as excitation light, the specimen 70 emits light, which can in particular be fluorescent light, which in comparison with the excitation light has a greater wavelength or, in other words, a lower energy. This light emitted by the specimen 70 is guided via the same optical components, thus via the microscope objective 50, the scanner 40 to the main color splitter 30.

In any case the components of the light emitted by the specimen 70, which have a greater wavelength than the incident excitation light, are transmitted by the main color splitter 30 and focussed via a lens 60 onto a confocal pinhole 61. The radiation passing through the confocal pinhole 61 is guided via a lens 63 onto a beam splitter 64 which once more spectrally divides the light emitted by the specimen. The two portions produced are then guided onto a first detector 92 and a second detector 94 in the detection unit 90. A filter 93 is arranged in front of the detector 92 and a filter 95 is arranged in front of the detector 94. The filters 93 and 95 serve to filter out undesirable spectral components. The outputs of the detectors 92 and 94 are connected to an evaluation unit 80, which is typically a computer. With a microscope 100 of the type shown in FIG. 3, measurements can be carried out as previously described with reference to FIG. 1 and FIG. 2.

A first exemplary embodiment of a multi-color scanning microscope 200 according to the invention is explained by reference to FIG. 4.

In general the same components or those having the same effect are identified in the figures by the same reference symbols in each case. Below, only the respectively different features that are characteristic for the respective embodiments are described.

By way of deviation from the microscope 100 of the prior art in FIG. 3, in the microscope 200 according to the invention in FIG. 4 the coupling-in means 20, 25.1, thus the mirror 20 and the semi-transparent mirror 25.1, are positioned and arranged so that the first excitation beam 12 and the second excitation beam 15 are coupled into the excitation beam path at different angles. This results in the first excitation beam 12 and the second excitation beam 15 also impinging on the main color splitter 30, the scanner 40 and the microscope objective 50 at a different angle and ultimately being focussed on different specimen areas, which can also be described as specimen locations, of the specimen 70. The first excitation beam 12 is focussed onto a first specimen area 72 and the second excitation beam 15 onto a second specimen area 74. The light 82 emitted by the first specimen area 72 is guided in the detection beam path through the same optical components, thus the microscope objective 50 and the scanner 40, back to the main color splitter 30, which in turn transmits the spectral portions with lower energy. Subsequently, the light 82 emitted by the first specimen location 72 passes via the lens 60, a confocal pinhole 62, a mirror 66 and a filter 95 and arrives at the detector 92. In complete correspondence, the light 84 emitted by the second specimen location 74 is guided via the microscope objective 50, the scanner 40, the main color splitter 30, the lens 60, a confocal pinhole 65 and a filter 93 to the second detector 94.

It is significant to the invention in the embodiment shown in FIG. 3 that the coupling-in means 20, 25.1 are changed so that the first excitation beam 12 and the second excitation beam 15 are coupled into the excitation beam path at a different angle and are ultimately focussed onto different specimen locations, namely the first specimen location 72 and the second specimen location 74. In addition it is significant that the radiation 82, 84 emitted by these different specimen locations in response to the differing excitation light is detected with the aid of different detectors, namely the first detector 92 and the second detector 94.

Figure 5:
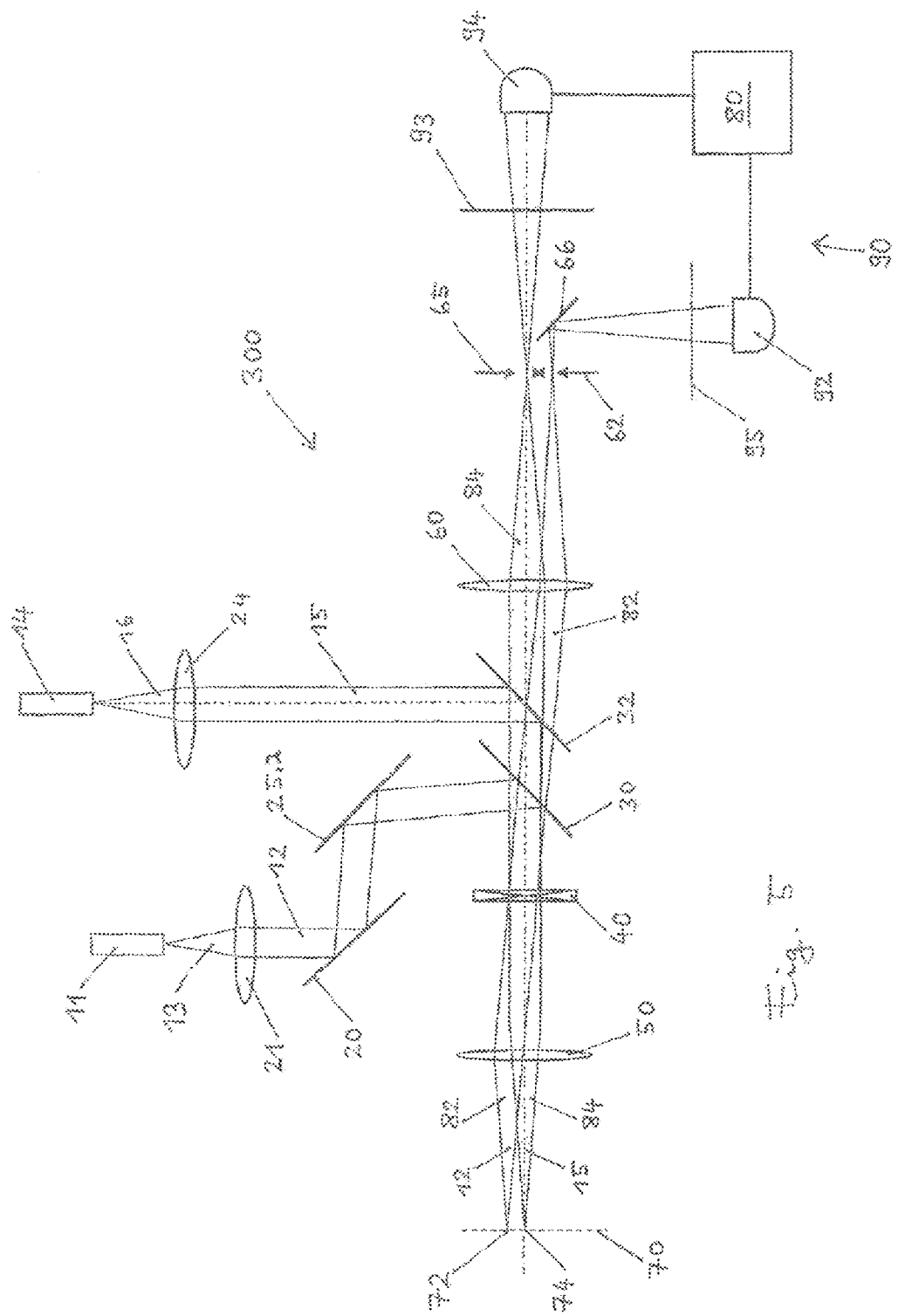
FIG. 5 shows a second exemplary embodiment of a multi-color scanning microscope according to the invention.

A second variant of a multi-color scanning microscope 300 according to the invention is described in connection with FIG. 5. The essential difference of the exemplary embodiment of FIG. 5 in comparison with the exemplary embodiment of FIG. 4 is that the first excitation beam 12 and the second excitation beam 15 are no longer coupled-in with one and the same first main color splitter 30, but instead the first excitation beam 12 is coupled into the beam path with the first main color splitter 30 and the second excitation beam 15 with a second main color splitter 32. The coupling-in means 20, 25.2 are positioned for this in a correspondingly deviating manner from the structure shown in FIG. 4, namely so that the second excitation beam 15 no longer has to pass through the mirror 25.1. The mirror 25.2 can therefore also be a fully reflecting mirror in the exemplary embodiment of FIG. 5. In principle, through the described measure of using a second main color splitter 32 with respect to the generation of different focal points on the specimen 70, essentially the same is achieved as in the embodiment shown in FIG. 4.

The differences can be seen in practical operation. While, for the example of FIG. 4, in general for each combination of a first light source 11 and a second light source 14 a suitable special first main color splitter 30 is necessary, this is no longer required in the example of FIG. 5. In principle, here, the second light source 14 with the second main color splitter 32 could be replaced by another light source 14 which emits excitation light of another, different wavelength, and another main color splitter. With respect to the detection of the light 82, 84 emitted by the first specimen location 72 and the second specimen location 74, with the aid of the first detector 92 and the second detector 94 there are no differences in the example of FIG. 5 in comparison with the variant of FIG. 4.

A third exemplary embodiment of a multi-color scanning microscope according to the invention is finally explained with reference to FIGS. 6, 7 and 8. FIG. 6 shows the substantial part of the excitation beam path, FIG. 7 shows a first part of the detection beam path D and FIG. 8 shows a second part of the detection beam path D.

In the variant shown in FIG. 6, besides the first light source 11 and the second light source 14, a further, third light source 17 is provided, which emits a further, third excitation beam 18 with third excitation light 19 which has a third wavelength which differs from the first and the second wavelength.

The essential difference of the exemplary embodiment shown in FIG. 6 in comparison with the variants described thus far is that a segmented first main color splitter 30 is used. The main color splitter 30 has a first segment 31, a second segment 33 and a third segment 35. The first segment 31 serves for coupling-in of the first excitation light 13, the second segment 33 for coupling-in of the second excitation light 16 and the third segment 35 for coupling-in of the third excitation light 19. The geometry of the beam paths can be seen in detail in FIG. 6. With the aid of respective, in particular separate, lenses 23, 26, 29, of which the optical axes are displaced parallel to each other, these excitation beams are initially focussed into a first focal plane 22 and go from there via a further lens 27 onto the scanner 40 and from there onto the microscope objective 50, by which the excitation beams 12, 15, 18 are focussed onto a first specimen location 72, a second specimen location 74 or a third specimen location 76.

In response to the incidence of the excitation light the specimen locations 72, 74, 76 emit light 82, 84, 86, as shown in FIG. 7 for the detection beam path D. The light 82, 84, 86 emitted by the specimen locations 72, 74, 76 then covers, as in the exemplary embodiments explained in connection with FIGS. 4 and 5, in principle the same optical path back to the first main color splitter 30. There, the portions of the light beams 82, 84, 86 with lower energy or higher wavelength are transmitted through the segments 31, 33 and 35, respectively.

FIG. 8, finally, shows how the light 82, 84, 86 emitted by the specimen locations 72, 74, 76 is focused with a lens 60 onto a confocal pinhole 61 and impinges from there via filters 93, 95, 97 onto detectors 92, 94, 96. It is essential to the present invention in turn that respectively different specimen areas 72, 74, 76 are illuminated with excitation light of differing wavelength and the light 82, 84, 86 radiated back by these specimen areas 72, 74, 76 is detected in turn by different detectors 92, 94, 96 in each case. The peculiarity of the exemplary embodiment of FIGS. 6 to 8 is that the light 82, 84, 86 to be detected, emitted by the different specimen locations 72, 74, 76, is guided through one and the same pinhole 61. The pinhole 61 is thus better utilised.

In the example shown in FIGS. 4 to 8, the use of a common pinhole 61 is made possible through the separate lenses 23, 26, 29. These collimate, as can be seen in particular from FIG. 7, the beams incoming in the intermediate image plane 22, which go back to the specimen locations 72, 74, 76, onto beams 82, 84, 86 respectively parallel to each other to the right of the beam splitter 30 in FIG. 7 as well as far to the left in FIG. 8. The fact that the beams 82, 84, 86 are parallel to each other allows these beams to be focussed by the lens 60 onto the common pinhole 61.

LIST OF REFERENCE SYMBOLS

A Excitation beam path
D Detection beam path
a1 Excitation spectrum DAPI
a2 Excitation spectrum FITC
a3 Excitation spectrum Alexa 488
a4 Excitation spectrum Alexa 647
e1 Emission spectrum DAPI
e2 Emission spectrum FITC
e3 Emission spectrum Alexa 488
e4 Emission spectrum Alexa 647
λ Wavelength
11 First light source
12 First excitation beam
13 First excitation light
14 Second light source
15 Second excitation beam
16 Second excitation light
17 Further light source
18 Further excitation beam
19 Further excitation light
20 Coupling-in means
21 Lens
22 Focal plane
23 Lens
24 Lens
25 Further coupling-in means
25.1 semi-transparent mirror
25.2 fully reflecting mirror
26 Lens
27 Lens
29 Lens
30 First main color splitter
31 First segment of the first main color splitter 30
32 Second main color splitter
33 Second segment of the first main color splitter 30
35 Third segment of the first main color splitter 30
40 Scanner
30, 40, 50 Optical means
50 Microscope objective
60 Lens
61 Pinhole
62 Pinhole
63 Lens
64 Beam splitter
65 Pinhole
66 Mirror
70 Specimen
72 First specimen location
74 Second specimen location
76 Further specimen locations
80 Evaluation unit
82 Detection light emitted by the specimen location 72
84 Detection light emitted by the specimen location 74
86 Detection light emitted by the specimen location 76
90 Detection unit
92 First detector
93 Filter
94 Second detector
95 Filter
96 Third detector
97 Filter
100 Multi-color scanning microscope
200 Multi-color scanning microscope
300 Multi-color scanning microscope

The invention claimed is:

1. Multi-color scanning microscope, comprising:
at least one first light source for emitting a first excitation beam with first excitation light of a first wavelength and a second light source for emitting a second excitation beam with second excitation light of a second wavelength which differs from the first wavelength,
coupling-in means for coupling-in at least one of: the first excitation beam or the second excitation beam, into an excitation beam path,
optical means for guiding the first excitation beam and the second excitation beam to a specimen and for guiding detection light emitted by the specimen in a detection beam path, wherein the optical means have at least the following components:

at least one first main color splitter for separating at least one of: the first excitation light or the second excitation light, from the detection light emitted by the specimen, a scanner for scanning the specimen with at least the first excitation light and the second excitation light, a microscope objective for focusing the first excitation light and the second excitation light onto or into the specimen and for guiding the detection light emitted by the specimen in the direction of the detection beam path, respectively separate optical elements for at least one of each excitation beam in the excitation beam path and each detection beam in the detection beam path, wherein the optical axes of the separate optical elements are displaced for at least one of different excitation beams and detection beams; and a detection unit for detecting the detection light emitted by the specimen, wherein the coupling-in means and at least parts of the optical means are set up and arranged in such a way that the first excitation beam with the first wavelength is guided onto a first specimen location and the second excitation beam with the second wavelength is guided onto a second specimen location which differs from the first specimen location, the detection unit has a first detector for detecting the light emitted by the first specimen location and a second detector for detecting the light emitted by the second specimen location, and the light emitted by the first specimen location subjected to the first excitation beam with the first wavelength and the light emitted by the second specimen location subjected to the second excitation beam with the second wavelength and possibly light emitted by further specimen locations pass through one and the same common pinhole.

2. The multi-color scanning microscope according to claim 1, wherein
the first excitation beam is coupled-in at a first angle into the excitation beam path and
the second excitation beam is coupled-in at a second angle which differs from the first angle into the excitation beam path.

3. The multi-color scanning microscope according to claim 1, wherein
the first excitation beam is coupled-in with the first main color splitter and the second excitation beam is coupled-in with a second main color splitter into the excitation beam path.

4. The multi-color scanning microscope according to claim 1, wherein
the first main color splitter has a first segment as coupling-in means at least for coupling-in the first excitation beam into the excitation beam path, and has a second segment for coupling-in the second excitation beam into the excitation beam path.

5. The multi-color scanning microscope according to claim 1, wherein
at least one further light source is provided for emitting a further excitation beam with further excitation light, of which the wavelength is different from the first wavelength and the second wavelength, and further coupling-in means are provided for the further excitation beam and are set up and positioned together with at least parts of the optical means in such a way that
the further excitation beam can be focused onto a further respectively different specimen location, which is different from the first specimen location, onto which the first excitation beam can be focused, and the second specimen location, onto which the second excitation beam can be focused.

6. The multi-color scanning microscope according to claim 1, wherein
for the separate detection of detection light which is radiated back by different specimen locations, at least a number of detectors corresponding to the number of excitation beams are provided.

7. The multi-color scanning microscope according to claim 1, wherein
the first light source is an argon-ion laser having a first wavelength of 488 nm and the second light source is a diode-pumped solid state (DPSS) laser having a second wavelength of 561 nm.

8. The multi-color scanning microscope according to claim 1, wherein
the first main color splitter has one or more notch filters.

9. The multi-color scanning microscope according to claim 1, wherein
a separate scanner is provided for each excitation beam to be coupled into the excitation beam path.

10. The multi-color scanning microscope according to claim 1, wherein
the scanner is positioned in a pupil of the microscope objective.

11. The multi-color scanning microscope according to claim 1, wherein
an evaluation unit is provided to evaluate the measurement data supplied by the detectors.

12. The multi-color scanning microscope according to claim 1, which is a confocal microscope.

13. The multi-color scanning microscope according to claim 1, wherein
the common pinhole is positioned in front of the first detector and the second detector.

14. The multi-color scanning microscope according to claim 1, wherein
the common pinhole is positioned directly in front of the first detector and the second detector.

15. The multi-color scanning microscope according to claim 1, wherein
the common pinhole is positioned in front of the different detectors used.

16. The multi-color scanning microscope according to claim 1, wherein
the common pinhole is positioned in front of the first detector and the second detector and in an intermediate image plane of the detection beam path.

17. The multi-color scanning microscope according to claim 1, wherein
the separate optical elements comprise separate lenses, and respectively at least one separate lens is provided for at least one of each excitation beam in the excitation beam path and each detection beam in the detection beam path, wherein the optical axes of the separate lenses are displaced for at least one of different excitation beams and detection beams.

18. The multi-color scanning microscope according to claim 17, wherein a plurality of the separate lenses are produced lithographically on a common carrier.

19. The multi-color scanning microscope according to claim 1, wherein separate optical elements are respectively provided for each excitation beam in the excitation beam path wherein the optical axes of the separate optical elements are displaced for different excitation beams; and/or separate optical elements are respectively provided for each detection beam in the detection beam path wherein the optical axes of the separate optical elements are displaced for different detection beams.

20. Multi-color scanning microscope, comprising:

at least one first light source for emitting a first excitation beam with first excitation light of a first wavelength and a second light source for emitting a second excitation beam with second excitation light of a second wavelength which differs from the first wavelength, coupling-in means for coupling-in at least one of: the first excitation beam or the second excitation beam, into an excitation beam path, optical means for guiding the first excitation beam and the second excitation beam to a specimen and for guiding detection light emitted by the specimen in a detection beam path, wherein the optical means have at least the following components:

at least one first main color splitter for separating at least one of: the first excitation light or the second excitation light, from the detection light emitted by the specimen, a scanner for scanning the specimen with at least the first excitation light and the second excitation light, a microscope objective for focusing the first excitation light and the second excitation light onto or into the specimen and for guiding the detection light emitted by the specimen in the direction of the detection beam path, respectively separate optical elements for at least one of each excitation beam in the excitation beam path and for each detection beam in the detection beam path, wherein the optical axes of the separate optical elements are displaced parallel to each other for at least one of different excitation beams and detection beams; and a detection unit for detecting the detection light emitted by the specimen in the detection beam path, wherein the coupling-in means and at least parts of the optical means are set up and arranged in such a way that the first excitation beam with the first wavelength is guided onto a first specimen location and the second excitation beam with the second wavelength is guided onto a second specimen location which differs from the first specimen location, the detection unit has a first detector for detecting the light emitted by the first specimen location and a second detector for detecting the light emitted by the second specimen location, and the light emitted by the first specimen location subjected to the first excitation beam with the first wavelength and the light emitted by the second specimen location subjected to the second excitation beam with the second wavelength and possibly light emitted by further specimen locations pass through one and the same common pinhole.

21. The multi-color scanning microscope according to claim 20, wherein separate optical elements are respectively provided for each excitation beam in the excitation beam path wherein the optical axes of the separate optical elements are displaced for different excitation beams; and/or separate optical elements are respectively provided for each detection beam in the detection beam path wherein the optical axes of the separate optical elements are displaced for different detection beams.

* * * * *